United States Patent Office 3,081,235
Patented Mar. 12, 1963

3,081,235
DENTIFRICE
George E. Morris, 520 Commonwealth Ave.,
Boston, Mass.
No Drawing. Filed Sept. 22, 1960, Ser. No. 57,614
12 Claims. (Cl. 167—93)

This invention relates to a dentrifice of improved tooth cleansing properties. Particularly, it relates to a dentrifrice of liquid to solid consistency comprising an absorbent solid polishing or abrading agent and, as the essential cleansing agent, a blend of an acid sulfonated non-drying higher fatty glyceride oil, acid sulfonated higher fatty alcohols and hydroxy fatty acids, and sulfonated drying oils and acid sulfonated resins, preferably further blended with a higher aliphatic ester.

Depending upon whether the dentifrice is to be used in solid form, such as a toothpowder, or liquid to gelatinous flowable body as a liquid or a paste, my composition will contain a solid, preferably absorptive, polishing or abrading agent in quantity of from about 10 to 90%, my acid sulfonated oil blend from about 5 to 90% and up to about 10% of glycerine, all percentages being by weight.

The composition, of course, can contain other usual minor dentrifrice components for their usual known effect. For instance, the composition can contain certain flavoring agents such as spearmint, wintergreen, cinnamon and the like; nontoxic preferably FD & C approved coloring agents; thickeners such as starch, methyl cellulose, perfumes and sweetening agents such as saccharin, and the like.

The polishing or abrasive agent may be solid, usually dry and powdered substances, such as various dry and finely divided clays, chalks, such as precipated calcium carbonate, active charcoal, hydrous oxides in the form of finely divided particles, such as hydrous alumina, and hydrous colloidal silica, preferably available as Cab-O-Sil and other common polishing agents. For this purpose I have found that English kaolin (china clay) is a much superior cleansing and polishing agent to others and it is preferred.

The English kaolin has the following analysis:

| | | |
|---|---|---|
| $SiO_2$ | percent | 46.80 |
| $Al_2O_3$ | do | 38.22 |
| $Fe_2O_3$ | do | 0.68 |
| $TiO_2$ | do | 0.01 |
| MgO | do | 0.25 |
| CaO | do | 0.43 |
| $K_2O$ and $Na_2O$ | do | 1.35 |
| Loss on ignition | do | 12.54 |
| Pb | p.p.m. | 5 |
| As | p.p.m. | 2 |
| Water absorption | percent | 57 |
| Oil absorption (pts. linseed oil per 100 pts. dry clay by wt.) | | 35–42 |
| Specific gravity | | 2.89 |

The essential cleansing agent, the acid sulfonated oil blend is not a soap, but rather the free acid sulfonate preferably blended with one or more neutral aliphatic esters of higher fatty acids. The blend is composed entirely of esters of sulfonic acid including some carboxylic acid esters having a pH in the range of 4.5 to 6, preferably about 4.5 to 5.0. The major component of the blend is a mixture of sulfonation products and the minor component, optionally included, is one or more simple esters of higher fatty acids, such as the lower alkyl esters of fatty acids having from 12 to 26 carbon atoms, the fatty acid being either fully saturated or un-saturated to such limited degree that the fatty acid is non-drying. As disclosed in my U.S. Patent Number 2,809,166, the sulfonated oil is a crtical blend of three sulfonation products each present in admixture with the others.

The terms "sulfonation" or "sulfation" refer respectively to types of mineral sulfuric acid esters with the oily organic residues. The former "sulfonation" usually indicates a directly bonded radical, sulfonic acid, with the hydrocarbon residue to form a sulfonate ester; and the latter, "sulfation" indicates a direct bond with an alcohol residue to form a sulfate ester. Sometimes both are present when either type of residue is treated to form the ester. Accordingly, as used herein, the term "sulfonation" is intended to identify the common commercial esterification which may be either or both sulfonation or sulfation products, as commercially available for these substances.

The first sulfonation component of the preferred blend is a sulfonation product of a non-drying fatty glyceride oil of animal or vegetable origin such as commercial fixed glycerides, insufficiently unsaturated to be drying. Included within this group are the glyceride esters of saturated or unsaturated fatty acids ranging from about 14 through 26 carbon atoms, and includes the usual animal and vegetable non-drying glyceride fatty oils, typical examples of which are sulfonated neat's-foot oil, sulfonated olive oil, sulfonated corn oil, sulfonated peanut oil, sulfonated cocoanut oil, and sulfonated tallow. This sulfonated oil component acts, particularly in combination with the alkyl ester component, both as an emollient oil and as a tooth cleanser. It is non-irritating and nontoxic to oral mucose, either alone or in the composition hereof. In the present composition, it is used in quantity of from 0.5 to about 1.5 parts by weight of the sulfonated oil blend.

The second type of sulfonation product used in the preferred blend is a high molecular weight sulfonation product of fatty alcohols, alcohol glyceride esters, or alcohol acids having from 12 to 26 carbon atoms. Typical examples are sulfonated castor oil, sulfonated ricinoleic acid, sulfonated lanolin and sulfonated relatively pure alcohols from 12 to 26 carbon atoms such as lauryl, cetyl and commercial mixtures of alcohols in this range usually obtained by reduction of lower alkyl esters of commercial fatty oils such as palm oil or cocoanut oil. The function of this second sulfonated component is to aid in the emulsification, removal by washing with water of both the unsulfonated, as well as sulfonated solvents used in the blend to extend the range of solubility of the composition and in combination with the other sulfonated oils. This second component is usually used in the range from 0.25 to 1.0 part by weight of the sulfonated oil blend.

The third component of the sulfonated oils of the preferred blend is generally selected from among commercial sulfonation products to be resinous or resin forming, i.e., characterized by being readily oxidized and polymerized. In this group are typical drying oils and semi-drying oil, glycerides, their free fatty acids and natural resinous acids. Typical sulfonation products of this group are sulfonated linseed oil, sulfonated soyabean oil, sulfonated tall oil and sulfonated unsaturated petroleum hydrocarbon. The first component, sulfonated oil, while having the desirable functions set forth, does not homogeneously blend with the unsulfonated alkyl ester component. It is the primary function of this third component to effect the homogeneous solution of both of these components. This third component is usually present in from about 0.1 to about 0.5 part by weight of the sulfonated oil blend.

These three sulfonated types of components are preferably used in admixture with each other as the major or sulfonated component of the tooth cleanser composition, and each modifies the effect of the other to improve the cleaning and solvent effect, the homogeneity and ready removal of the non-sulfonated component and imparts to the sulfonated oil mixture improved solvent power in the combination.

The minor component of the preferred blend hereof (referred to herein as "minor" only in the quantitative sense, since the greater proportions of the composition is the sulfonated oil components) is a lower saturated alkyl ester of a higher fatty acid, preferably saturated, but which may be unsaturated to an extent insufficient to impart drying characteristics. Thus the fatty acid portion of the ester may range from 12 to 26 carbon atoms, the fatty esters being preferably saturated, but if unsaturated such is usually insufficient to be substantially drying in character. The alkyl portion of the ester is derived from an alcohol having one through six carbon atoms and an alkyl in this range would be understood herein as a "lower" alkyl. Typical esters used herein are the lower alkyl esters of lauric acid, myristic acid, palmitic acid, stearic acid, oleic acid and archidic acids. The typical alkyl groups used are those derived from the alcohols ethyl, propyl, isopropyl, butyl, isobutyl, isoamyl and n-hexyl. Esters of this type are preferred in my composition because they, in themselves, have high solvent power. They are readily emulsified by the sulfonated oils used in combination therewith. They are inherently emollient, non-toxic and non-irritating in the composition as used. When used, blended with the sulfonated oil, the unsulfonated alkyl ester will be a minor component of the preferred blend and is adjusted in the composition to the range of 0.5 to 1.5 parts by weight of the composition.

A third component which is optionally but preferably present in my dentifrice is glycerine. When it is used it will usually be present in the proportion of about 5 to 10% by weight of the composition. It has the effect of rendering the composition more rapidly water miscible in slight contrast to the usual property of being readily emulsifiable. In the presence of the glycerine my composition becomes easily rinsed from the teeth without scrubbing.

In the liquid form my dentifrice composition will usually contain from 20 to about 40% polishing agent, preferably English kaolin, the balance being the acid sulfonated oil blend and optionally up to 10% by weight of glycerine and other additives, as listed above. In the paste form my composition will comprise from about 30 to 80% polishing agent, preferably kaolin, the balance being acid sulfonated oil and up to 10% of the glycerine and other additives. As an emperically solid polishing powder, my composition will comprise about 65 to 90% polishing agent, preferably English kaolin, and from about 10 to 30% acid oil, the balance being glycerine and other optional additives. It will be noted that these formulas as given for liquid, paste and solid dentifrice are only general formulas which will usually, but not critically, also contain about 5 to 10% of glycerine and which usually will contain other minor quantities less than about 5%, and usually less than 2%, of conventional additives such as sweetening agents, thickeners, flavoring agents and the like.

The following table sets forth a preferred acid sulfonated oil blend, as a general formulation, showing the preferred range of components of this blend which will be mixed with the solid polishing agent in the quantity set forth above in the general dentifrice formulations.

| Substances: | Parts by weight |
|---|---|
| Sulfonated animal or vegetable non-drying oil | 0.5 to 1.5 |
| Sulfonated hydroxylated fatty oil, sulfonated hydroxy fatty acid or sulfonated higher alcohol | 0.25 to 1.0 |
| Sulfonated drying oils and resins | 0.1 to 0.5 |
| Lower alkyl esters of fatty acids | 0.5 to 1.5 |

As indicated, my preferred polishing agent is a kaolin because it is highly absorbent. It will absorb some 35 to 42% by weight of acid oil. A preferred general formulation comprises English kaolin having absorbed therein from 35 to 42% by weight of acid sulfonated oil blended to have the composition of the above table, including further 5 to 10% of glycerine and minor amounts up to 2% of optional additives as described.

The following specific examples illustrate the practice of this invention. The acid oils are those which are commerically available and the blends are made by simple admixture sometimes with a slight amount of heat not usually above about 100° F.

*Example I*

Fifteen percent of English kaolin is blended with 83% of an acid sulfonated oil blend consisting of 1 part of sulfonated peanut oil, 0.25 part by weight of sulfonated linseed oil, 0.5 part of sulfonated sperm oil and 1 part by weight of n-hexyl laurate, the composition further containing 1.9% corn starch as thickener, .08% spearmint to flavor and .02% saccharin for sweetening agent, all parts and percents being by weight.

*Example II*

Thirty-nine percent of English kaolin is mixed with 10% glycerine and 55% of an acid sulfonated oil consisting of 0.75 part sulfonated tallow, 0.6 part sulfonated lanolin, 0.15 part sulfonated soyabean oil and 1.2 parts of ethyloleate, the balance comprising up to 1% of flavoring, and sweetening agents, all parts and percents, by weight.

*Example III*

Eighty-five percent by weight of English kaolin is mixed with 14% of an acid sulfonate oil consisting of 1.1 parts of sulfonated neat's-foot oil, 0.6 part of sulfonated castor oil, 0.3 part of sulfonated tall oil and 0.9 part of butyl stearate, and about .1% of flavoring and sweetening agent, all parts and percent being by weight.

*Example IV*

90% by weight of finely powdered colloidal silica is mixed with 2% by weight of glycerine and 7½% by weight of the blended acid sulfonate oil of Example I and with ½% of minor additives comprising saccharin, spearmint and corn starch. The blend was formed into a powdery mixture and used as a tooth powder.

Various modifications will occur to those skilled in the art and accordingly, it is intended that the examples given herein be regarded as illustrative and not limiting except as defined in the claims appended hereto.

What I claim is:

1. A dentifrice comprising a finely divided absorbent solid abrading and polishing agent in quantity of from about 5 to 90%, glycerine up to 10%, and the balance a blend of 0.5 to 1.5 parts by weight of sulfonated non-drying glyceride fatty oil having 14 to 26 carbon atoms, 0.25 to 1.0 part by weight of a sulfonated compound having 12 to 26 carbon atoms and selected from the group consisting of a sulfonated fatty alcohol and a sulfonated fatty acid having a hydroxy group on the hydrocarbon radical of the fatty acid, 0.1 to 0.5 part by weight of a sulfonated drying oil having 12 to 26 carbon atoms and up to 1.5 parts by weight of a lower alkyl ester of a nondrying fatty acid having 12 to 26 carbon atoms.

2. The composition defined in claim 1 in which the lower alkyl ester is present in quantity of from 0.5 to 1.5 parts by weight.

3. The composition defined in claim 1 wherein the finely divided solid abrading and polishing agent is English kaolin.

4. A dentifrice comprising a finely divided absorbent solid abrading and polishing agent having absorbed therein from about 35 to 42% by weight of an acid sulfonated oil and further blended with 5 to 10% of glycerine, said acid sulfonated oil consisting essentially of 0.5 to 1.5 parts by weight of sulfonated non-drying glyceride fatty oil having 14 to 26 carbon atoms, 0.25 to 1.0 part by weight of a sulfonated compound having from 12 to 26 carbon atoms and selected from the group consisting of a sulfonated fatty alcohol and a sulfonated fatty acid having a hydroxy group on the hydrocarbon radical of the fatty acid, 0.1 to 0.5 part by weight of a sulfonated drying oil having 12 to 26 carbon atoms, and 0.5 to 1.5 parts by weight of a lower alkyl ester of a non-drying fatty acid having from 12 to 26 carbon atoms, all parts and percentages being by weight.

5. The dentifrice of claim 4 wherein the absorbent solid is English kaolin.

6. A dentifrice comprising 10 to 90% of a finely divided solid abrading and polishing agent, about 0 to 10% glycerine and 90 to 10% of an acid sulfonated oil blend consisting essentially of about 0.5 to 1.5 parts by weight of sulfonated peanut oil, about 0.25 to 0.75 part by weight of sulfonated sperm oil, about 0.1 to 0.5 part by weight of sulfonated linseed oil and about 0.5 to 1.5 parts by weight of a lower alkyl ester of a non-drying fatty acid having from 12 to 26 carbon atoms, all the parts and percentages being by weight.

7. A dentifrice comprising 10 to 90% of a finely divided solid abrading and polishing agent, about 0 to 10% glycerine and 90 to 10% of an acid sulfonated oil blend consisting essentially of about 1.0 part by weight of sulfonated peanut oil, about 0.5 part by weight of sulfonated sperm oil, about 0.25 part by weight of sulfonated linseed oil and about 1.0 part by weight of N-hexyl laurate.

8. A dentifrice comprising 10 to 90% of a finely divided solid abrading and polishing agent, about 0 to 10% glycerine and 90 to 10% of an acid sulfonated oil blend consisting essentially of about 0.5 to 1.5 parts by weight sulfonated tallow, about 0.25 to 0.75 part by weight of sulfonated lanolin, about 0.1 to 0.5 part by weight of sulfonated soyabean oil and about 0.5 to 1.5 parts by weight of a lower alkyl ester of a non-drying fatty acid having from 12 to 26 carbon atoms.

9. A dentifrice comprising 10 to 90% of a finely divided solid abrading and polishing agent, about 0 to 10% glycerine and 90 to 10% of an acid sulfonated oil blend consisting essentially of about 0.75 part by weight of sulfonated tallow, about 0.6 part by weight of sulfonated lanolin, about 0.15 part by weight of sulfonated soyabean oil and about 1.2 parts by weight of ethyl oleate.

10. A dentifrice comprising 10 to 90% of a finely divided solid abrading and polishing agent, about 0 to 10% glycerine and 90 to 10% of an acid sulfonated oil blend consisting essentially of about 0.5 to 1.5 parts by weight sulfonated neat's-foot oil, about 0.25 to 0.75 part by weight of sulfonated castor oil, and about 0.5 to 1.5 parts by weight of a lower alkyl ester of a non-drying fatty acid having from 12 to 26 carbon atoms.

11. A dentifrice comprising 10 to 90% of a finely divided solid abrading and polishing agent, about 0 to 10% glycerine and 90 to 10% of an acid sulfonated oil blend consisting essentially of about 1.1 parts by weight of sulfonated neat's-foot oil, about 0.6 part by weight of sulfonated castor oil, about 0.30 part by weight of sulfonated tall oil, and about 0.9 part by weight of butyl stearate.

12. The denifrice defined in claim 11 wherein the solid abrading and polishing agent comprises English kaolin.

References Cited in the file of this patent

UNITED STATES PATENTS

| | | |
|---|---|---|
| 1,968,858 | Sheffield | Aug. 7, 1934 |
| 2,809,168 | Morris | Oct. 8, 1957 |

OTHER REFERENCES

Pharmaceutical Formulas, vol. II, 1946, page 277, The Chemist and Druggist, London, England.